United States Patent [19]

Ludlow

[11] 4,053,002

[45] Oct. 11, 1977

[54] LIQUID DISPENSER WITH LIQUID LEVEL INDICATOR

[76] Inventor: Thomas B. Ludlow, 1515 Edgewater Ave., St. Paul, Minn. 55112

[21] Appl. No.: 648,267

[22] Filed: Jan. 12, 1976

[51] Int. Cl.² .......................... B67C 3/02; B65B 3/02
[52] U.S. Cl. ..................................... 141/95; 141/310; 141/367
[58] Field of Search ............... 141/94, 95, 96, 309, 141/310, 367, 368; 239/600, 230; 73/293; 116/118 R, 118 A; 356/103, 201, 209; 250/218, 223 R

[56] References Cited

U.S. PATENT DOCUMENTS

| | | | |
|---|---|---|---|
| 926,550 | 6/1909 | Dafoe | 141/367 |
| 2,047,580 | 7/1936 | Dewey | 141/310 |
| 3,043,522 | 7/1962 | Ryerson | 239/230 |
| 3,176,731 | 3/1965 | Minard | 141/367 |
| 3,434,513 | 3/1969 | O'Bannon | 141/95 |

Primary Examiner—Houston S. Bell, Jr.
Attorney, Agent, or Firm—H. Dale Palmatier

[57] ABSTRACT

A liquid dispenser having a liquid flow duct through which liquid may flow from a liquid source into a battery or the like. The dispenser includes a light-transmitting portion adjacent the flow duct to produce a visual indication of the surface elevation of a pool of liquid into which the liquid flows. Available light at the outer end of the light-transmitting portion passes in and through the latter to a reflective, inner end of the light-transmitting portion and is then reflected back out to provide a visual indication that the reflective end is not immersed in the pool of liquid. When the level of the pool has risen to immerse the reflective end, the available light reaching the reflective end is refracted into the liquid, and immersion is indicated by the relative absence of reflection.

14 Claims, 13 Drawing Figures

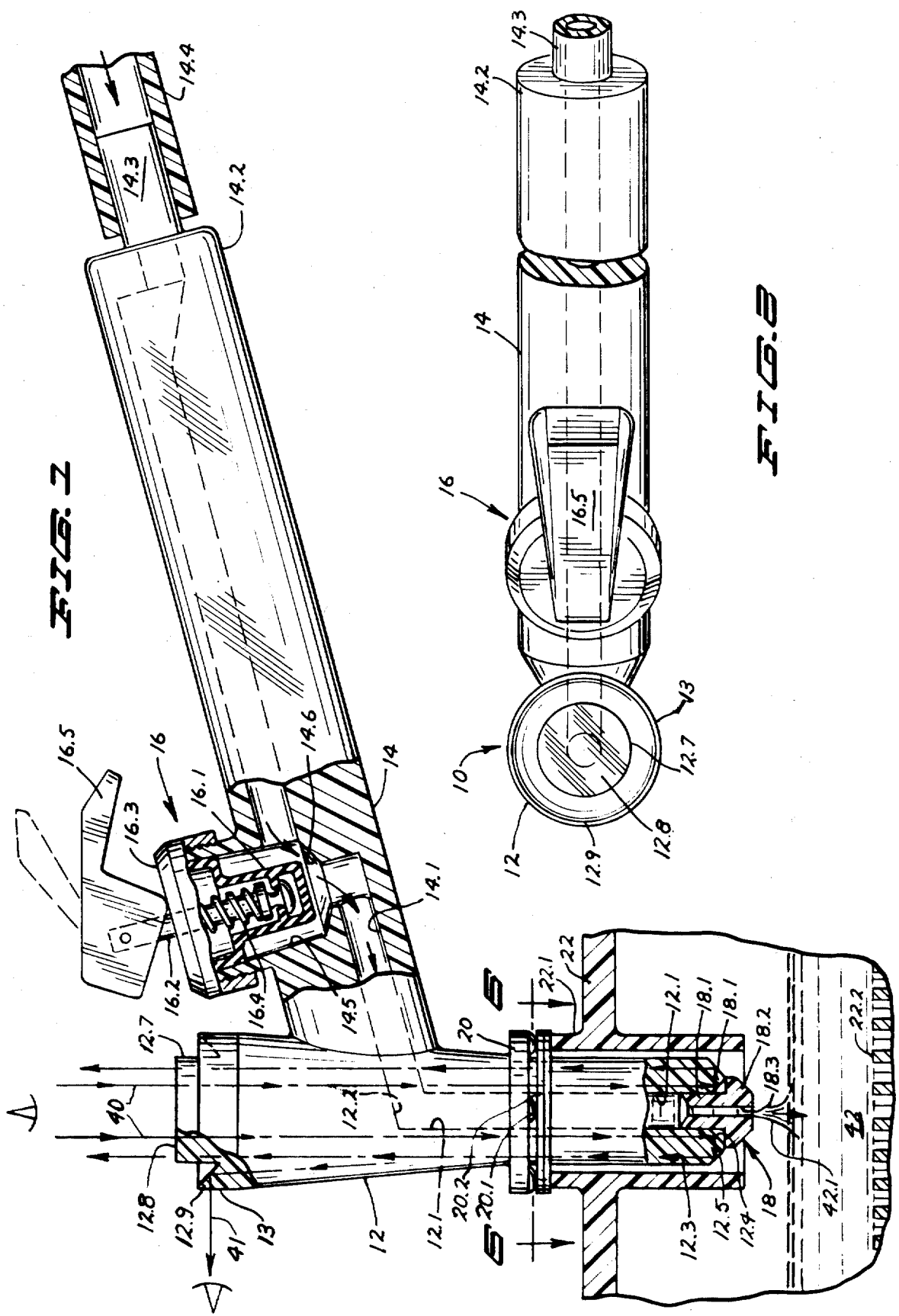

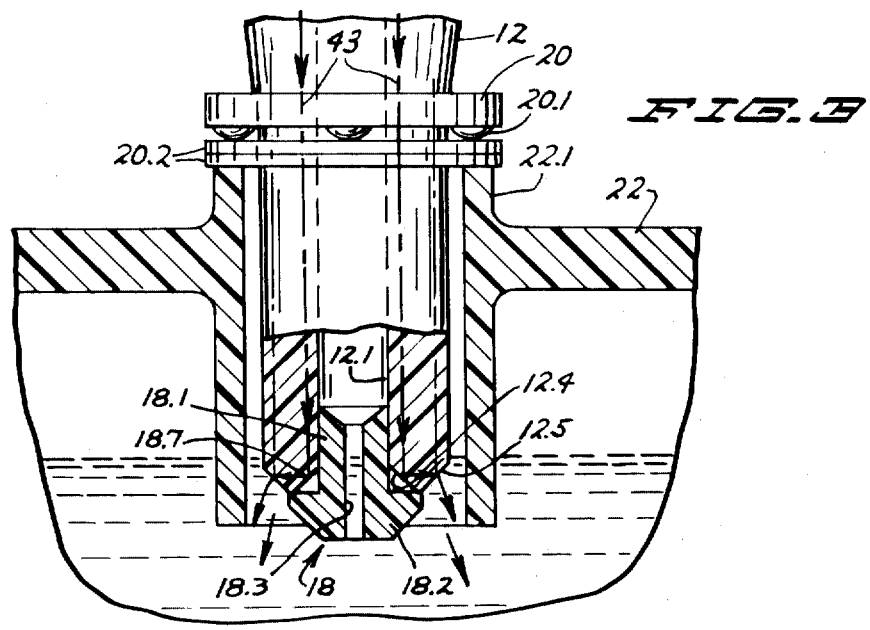
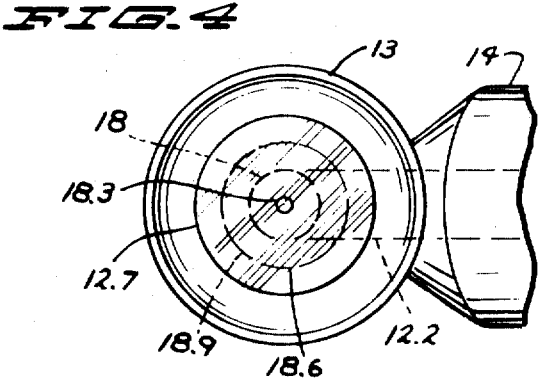
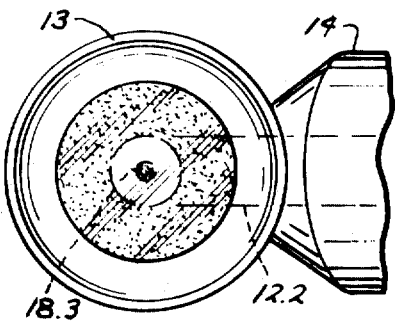
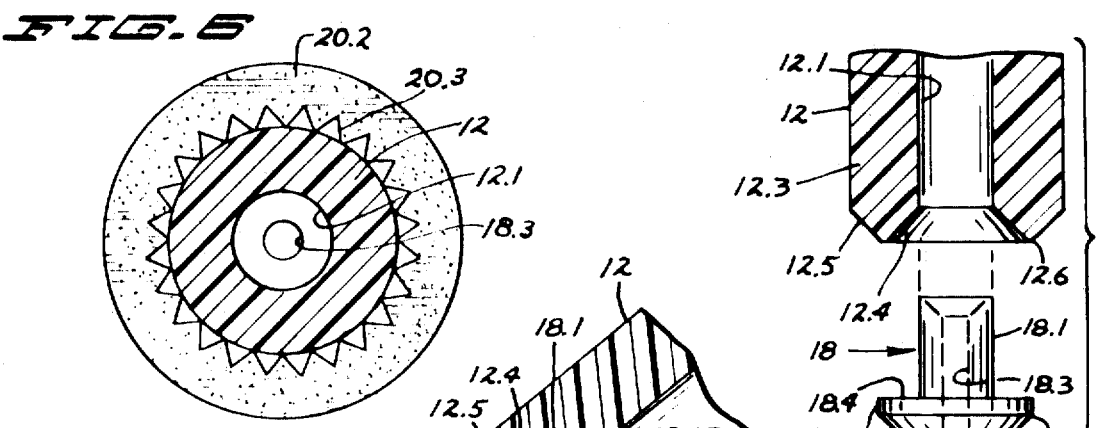

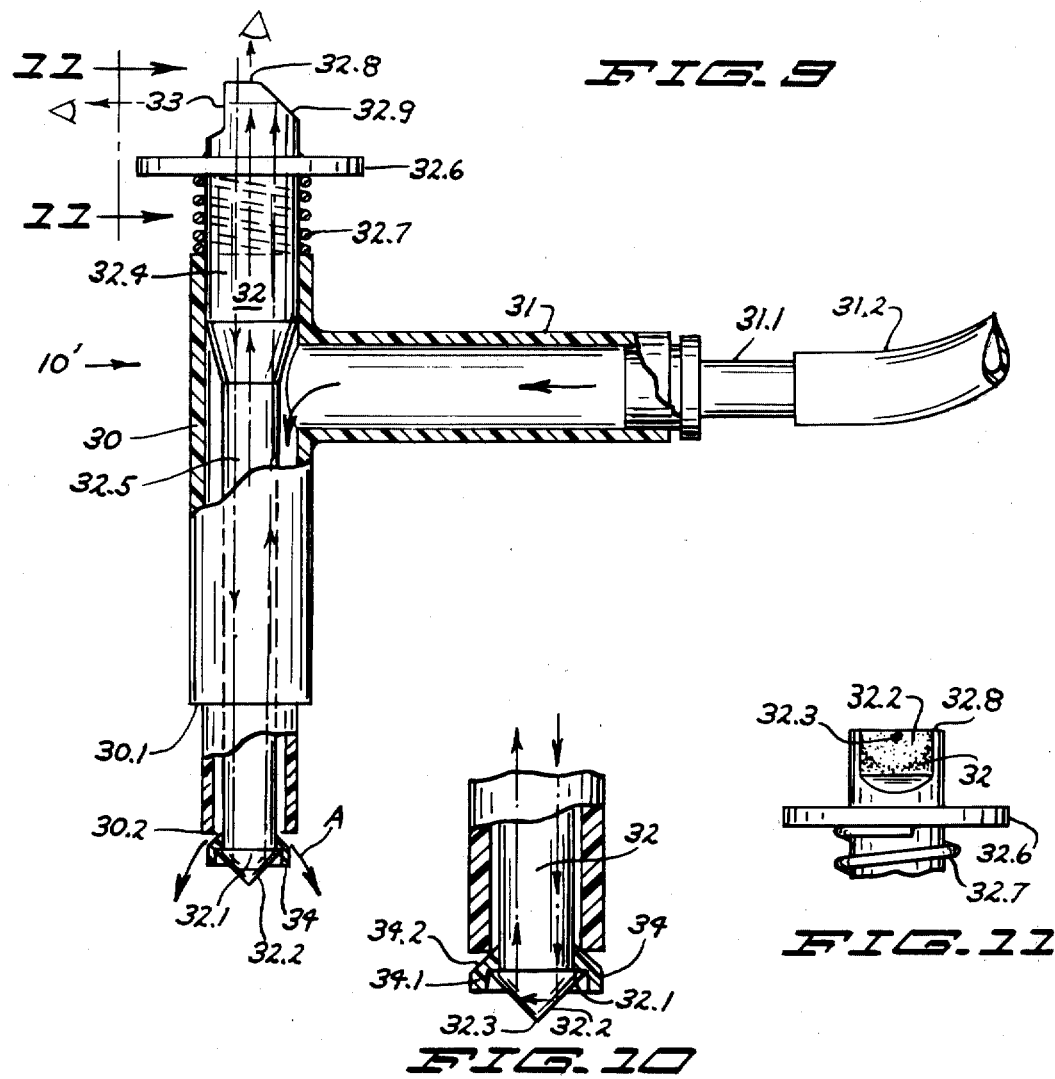
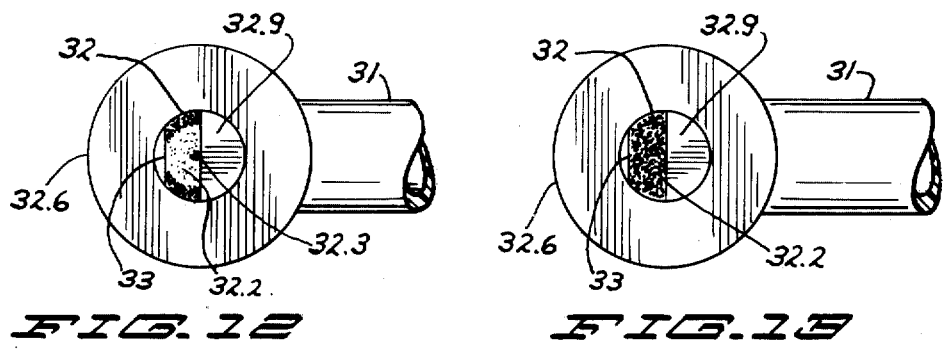

LIQUID DISPENSER WITH LIQUID LEVEL INDICATOR

BACKGROUND OF THE INVENTION

When liquid is to be added to a certain level within a container, particularly opaque containers, trouble is often experienced in determining when the flow of liquid into the container should be stopped to prevent the container from overflowing. This is particularly true when a liquid such as battery acid (sulfuric acid) is to be added to a new lead-acid battery of the conventional type. Battery acid, as is known, is highly caustic and care should be taken to prevent contact of the acid with the skin or clothing. When acid is introduced into a battery through a funnel or by means of a dispenser or the like, it is difficult, without periodically stopping to examine the liquid level, to see how full the battery has become. Such periodic examination requires the funnel or dispenser to be removed, with concurrent dripping and messiness and wastage of time. These problems are compounded by the fact that lead-acid storage batteries ordinary have a number of compartments, each of which must be filled separately.

A device which would enable a battery to be filled with acid and would provide a continuing visual indication as to whether the battery acid has reached a given level without requiring removal of the device would greatly reduce the amount of time required to fill batteries and would reduce or eliminate hazardous contact of skin or clothing with the battery acid during the filling operation.

SUMMARY OF THE INVENTION

The present invention provides a combination liquid dispenser for introducing liquid into a container (e.g., acid into a storage battery) and having a liquid level indicator for indicating the level of the liquid pool into which the liquid flows. The dispenser comprises an elongated nozzle having a liquid duct and an adjacent light-transmissive portion. The latter has a light ray-admitting outer end, and an inner end having a reflector exposed for contact with the air or with the liquid pool. The reflector is oriented to reflect the light rays toward the outer end when it is exposed to air, and to transmit or refract the light rays into the liquid when the reflector is contacted by the pool of liquid. The presence or absence of the reflected light rays at the outer end indicates to an observer the height of a liquid pool. The liquid flow duct is so constructed and arranged with respect to the exposed reflector as to prevent liquid flowing therethrough from contacting the exposed relector. The reflector may take the form of coacting optical surfaces angled with respect to one another at the inner end of the light-transmissive portion so as to reflect light when each surface is exposed to air and to refract light into the liquid pool when at least one of the surfaces is exposed to liquid in the pool.

In one embodiment, the dispenser may take the form of elongated, generally cylindrical body having a light-admitting upper end and a lower end and having light-transmitting walls about a central, longitudinal bore defining the liquid duct. At its lower end, inner and outer surfaces of the walls converge at about 45° angles to the longitudinal axis of the body to provide inner and outer optical surfaces. A plug is provided at the lower end of the body and is contoured to spacingly confront and provide a sealed, liquid-free space between the plug and the inner reflecting surface. The plug includes a duct in liquid flow communication with the liquid flow duct of the body to deliver liquid to a battery or the like. The plug may include a projecting portion intersecting the plane of the outer reflecting surface to protect the latter surface from becoming scratched through contact with a flat surface such as the top of a work bench. The upper end of the body includes a reflector adjacent the periphery of the body and oriented to reflect rays which impinge on it from the converging optical surfaces outwardly through the outer surfaces of the side wall so that rays reflected by the converging surfaces may be viewed not only from the upper end of the body but also from the sides of the body at its upper end. The reflector at the upper end also admits exterior light, and reflects the light toward the converging optical surfaces; this feature permits the dispenser to be used in poorly lighted areas where the primary light source may be an open door, or a flashlight, admitting light primarily to the side of the dispenser.

The liquid flow duct is provided with a manually operable valve to control the flow of liquid therethrough, and may be connected through a liquid line to a source of liquid. Liquid flow may be established through gravity, or by pressurizing the source of liquid. Means are also provided to enable air within a battery or other container to escape as the container is being filled. The latter means may include lugs or projections carried by the dispenser and which, when in contact with the periphery of a hole through which liquid is to be dispensed, provide air spaces between the dispenser and the hole periphery. Annular spacers, which fit about the body of the dispenser adjacent the lugs, may also be provided to control the depth to which the lower end of the dispenser protrudes within a container. The spacers are provided with holes or notches configured to lie in sufficient registry with the holes or notches of adjacent spacers so as to provide a continuous air escape path from the container to the atmosphere.

DESCRIPTION OF THE DRAWING

FIG. 1 is a side view, partially broken away and in partial cross section, of a dispenser of the invention in use for filling a battery or other container;

FIG. 2 is a top view of the dispenser of FIG. 1;

FIG. 3 is a broken away, cross-sectional view of a dispenser of the invention with the lower end thereof immersed in a pool of liquid;

FIGS. 4 and 5 are top views of the dispenser of FIG. 1 as the latter indicates that a container has not been filled with liquid (FIG. 4), and has been filled with liquid (FIG. 5);

FIG. 6 is a cross-sectional view taken along line 6—6 of FIG. 1;

FIG. 7 is an exploded view of the lower end of the dispenser shown in FIG. 1;

FIG. 8 is a broken away side view in cross section of the lower end of the dispenser of FIG. 1;

FIG. 9 is a cross-sectional side view of another embodiment of a dispenser of the invention;

FIG. 10 is a broken way, cross-sectional view of the lower end of the dispenser of FIG. 9;

FIG. 11 is a front view of the device of FIG. 9, taken along line 11—11 of FIG. 9, and showing the visual indication that the lower end of the dispenser is not immersed in liquid; and FIGS. 12 and 13 are top views of the dispenser of FIG. 9 and show visual indications that the lower end of the dispenser has not been (FIG. 12) and has been (FIG. 13) immersed in a pool of liquid.

DETAILED DESCRIPTION

Referring now to FIGS. 1 and 2, the dispenser of the invention is designated generally as 10 and comprises an elongated body 12 of light-transmitting material such as a clear plastic. At its lower end, the body is provided with a central bore 12.1 which extends upwardly in the body to a point intermediate its ends. A second bore 12.2 is provided in the side of the body and intersects the bore 12.1. To the side of the body is mounted a tube 14 having an internal bore 14.1 aligned with the bore 12.2. At its outer end 14.2, the tube has a fitting 14.3 to which may be attached a plastic hose 14.4 leading to a reservoir of liquid (not shown). The tube 14 is provided with a valve designated generally as 16 which may be of the type shown in U.S. Pat. No. 3,301,525. The tube 14 includes a recessed portion 14.5 which intersects the bore 14.1 and which provides a generally conical valve seat 14.6. A plug 16.1 carried by the valve 16 is arranged to engage the valve seat 14.6 and halt the flow of liquid through the bore 14.1. The plug 16.1 is made of soft, resilient material, and is generally cup-shaped, as shown in FIG. 1. A valve stem 16.2 extends within the plug 16.1 and is attached at its lower end to the plug such that movement of the valve stem axially up and down causes the plug to move out of and into contact with the valve seat 14.6. The valve 16 includes a cap 16.3 mounted to the tube 14, and a spring 16.4 carried internally of the valve urges the valve stem and plug downwardly so that the latter seats against the valve seat 14.6. At its upper end, the stem 16.2 is provided with a pivotally attached handle 16.5 having a camming surface which bears against the upper surface of the cap 16.3 so that as the handle is moved upwardly and downwardly between the solid and dashed line positions in FIG. 1, the valve stem 16.2 is moved axially back and forth to open and close the valve.

As shown perhaps best in FIG. 7, the walls 12.3 at the slender lower, or inner, end of the body 12 are cylindrical and have inner and outer surfaces 12.4, 12.5 which converge abruptly at approximately 45° angles to the axis of the body to form therebetween an included angle of about 90°. The conical surfaces 12.4, 12.5 are highly polished to provide reflective, optical surfaces which coact to form a reflector at the inner end of the body to reflect light in the manner shown in FIG. 1, as will be subsequently more fully explained. Inserted in the bore at the lower or inner end of the body is a plug or insert 18, the plug having a cylindrical shank 18.1 which is received tightly within the bore. At its lower end, the diameter of the shank increases abruptly to form a head 18.2. The plug has an axial through bore or orifice 18.3, the walls of the bore tapering outwardly at its upper end, as shown best in FIG. 8. The abrupt change in diameter of the plug afforded by the head 18.2 provides a generally upwardly facing ledge 18.4 (FIG. 7) which extends radially outwardly a sufficient distance so as to contact the sharp edged lower end 12.6 of the light-transmissive body. The plug is permanently affixed within the bore 12.1 of the body by solvent or friction welding or the like, and a weld bead or seam between the body 12 and the shank of the plug is shown at 18.5 in FIG. 8. Similarly, the lower sharp edge 12.6 of the body is solvent or heat welded, or otherwise permanently affixed, to the outer edge of the ledge 18.4 of the plug, a weld bead being shown as 18.6 in FIG. 8. The weldments 18.5, 18.6 provide permanent, waterproof seals between the plug and the body, and it will now be understood that a generally annular, liquid-free space 18.7 is thus permanently provided between the body and the plug so that the inner optical surface 12.4 of the body is continuously free from liquid contact.

Referring to FIGS. 7 and 8, it will be seen that the widest diameter portion of the plug is continued axially of the plug for a short distance to form a disclike portion 18.8. The lower edge 18.9 of the disc-like portion 18.8 extends outwardly of the curved surface of the optical surface 12.5, as shown best in FIG. 8; that is, the plug includes a projection portion intersecting the outer reflecting surface 12.5. Thus, when the lower end of the dispenser is placed in contact with a flat surface such as the top of a workbench or the like, the projecting edge 18.9 of the plug prevents the flat surface of the workbench from contacting (and thereby scratching, contaminating) the outer optical surface 12.5 of the body.

Referring now to FIGS. 1 and 2, the body 12 of the dispenser is substantially of solid material except for the ducts 12.1, 12.2, and tapers outwardly slightly toward its upper end. The body terminates upwardly in a projecting post 12.7 which is provided with a generally flat, polished upper surface 12.8 forming a "window" through which the optical surfaces 12.4, 12.5 of the body may be viewed from above. The upper end of the body is depressed about the periphery of the post 12.7, the upper surface of the body tapering outwardly and upwardly from the periphery of the post at approximately a 45° angle to the longitudinal axis of the body to form a reflecting prism 12.9. The side walls 13 of the body at its upper end are upright and generally parallel to the longitudinal axis of the body, and provide a viewing "window" through which the optical surfaces 12.4, 12.5 at the lower end of the body may be viewed. Because of the curvature of the prism 12.9, it will be understood that the view afforded of the optical surfaces 12.4, 12.5 from the side of the body of the dispenser will be somewhat distorted, but will be fully adequate for the purposes of the invention as will be described below. FIG. 1 shows that the post 12.7 extends upwardly slightly from the top of the prism 12.9; with this configuration, the top of the post may be easily wiped clean of foreign matter, and there is less tendency of the inwardly slanted portion of the prism to collect dirt or other contamination.

The body 12 of the dispenser includes, intermediate its ends, an outwardly extending disc or washer 20 configured to come into contact with the walls of a container and thus limit the distance to which the dispenser may be inserted in the container. The disc 20 includes a plurality of lugs or projections 20.1 on its underside to contact the container orifice and to provide air spaces through which air from the container may escape when the container is filled. The container is shown generally as 22 in FIGS. 1 and 3, and is provided with an upstanding collar 22.1 about a filling orifice. In order to adjust the depth to which the lower or inner end of the dipenser may be inserted within the container, one or more washer-shaped spacers 20.2 may be provided, each spacer having a central bore through which may be inserted the lower end of the dispenser. The spacers are provided with a series of ports through their thicknesses, which ports are so constructed and arranged as to overlap and lie in sufficient registry with the ports of adjacent spacers so as to provide continuous air escape path from the container to the atmosphere. In the embodiment shown in FIG. 6, the spacer 20.2 is provided with ports in the nature of notches 20.3 extending outwardly from the inner periphery of the spacer. In another embodiment (not shown), the spacer may be provided with a series of closely spaced holes through its thickness. The spacers are preferably of rubber or similar resilient material so that they can be easily drawn on and taken off the dispenser body.

Referring now to the embodiment of the invention shown in FIGS. 9—13, the dispenser 10' is shown with an elongated, hollow, upright barrel 30 which is intersected adjacent its upper end with another barrel 31 extending to one side of the upright barrel. The latter barrel extends outwardly from the upright barrel at a right angle, or at an upwardly inclined angle, and terminates in a nipple 31.1 to which may be attached a flexible plastic hose 31.2 leading from a source of liquid. Near its lower end, the barrel is reduced abruptly in diameter to form a downwardly facing ledge 30.1 which is contactable with the edges of an orifice of a container to be filled, in a manner similar to that shown in FIG. 3.

An elongated, upright, light-transmissive body 32 is slideably retained in the barrel 30. The body 32 projects beyond the lower end 30.2 of the barrel 30, and the downwardly projecting portion of the body expands abruptly to a disc-shaped portion 32.1 of increased diameter as shown best in FIGS. 9 and 10, and then tapers downwardly and inwardly to form a generally coneshaped head coaxial with the axis of the body, the walls 32.2 of the cone forming approximately 45° angles with the axis of the body.

At the lower end of the body 32 is carried an annular plug 34, the inner periphery of the plug engaging the walls of the body 32 above the head, and the plug having a downwardly oriented, annular ledge engaging the disc-shaped portion 32.1, as shown best in FIG. 10. The outer periphery of the plug includes a downwardly turned lip 34.1 which extends downwardly beyond the discshaped portion 32.1, but which desirably terminates above the vertex 32.3 of the cone-shaped head. The diameter of the plug is greater than the inner diameter of the lower end 30.2 of the upright barrel, and the plug is provided with an inwardly and upwardly tapered outer surface 34.2 adapted to sealingly engage the inner periphery of the lower end 30.2 of the upright barrel to thereby sealingly close the lower end of the barrel. When the body 32 is moved downwardly, the plug 34.2 remains with the lighttransmissive body 32, as shown best in FIG. 9, and liquid within the barrel must pass outwardly over the downwardly turned lip 34.1 of the plug, as shown by the arrows A in FIG. 9. The lip 34.1 further serves to protect the optical surface 32.2 of the lower end of the body.

The upper end 32.4 of the body has a diameter closely approaching the inner diameter of the barrel 30 so as to provide guidance for the body as the latter moves upwardly and downwardly in the barrel. At a point slightly above the intersection of the barrel 30 with the barrel 31, the diameter of the body 32 is gradually diminished to a length of reduced diameter indicated as 32.5 in FIG. 9, the space between the reduced diameter portion of the body and the barrel 30 providing an annular liquid flow duct through which liquid from the barrel 31 may pass downwardly. The upper end 32.4 of the body extends beyond the upper end of the barrel 30, and includes a transverse disc 32.6 which is spaced above the upper edge of the barrel. A helical spring 32.7 is provided between the upper edge of the barrel and the lower surface of the disc, and is held in compression to normally urge the body 32 upwardly in the barrel and thus seal the plug 34 against the lower end of the barrel, as shown in FIG. 10. The upper end 32.4 of the body extends through and beyond the disc 32.6 and terminates upwardly in a flat, highly polished face 32.8 which serves as a "window" through which the cone-shaped surface 32.2 may be viewed from above. One edge of the upper end of the body is formed at approximately a 45° angle to the longitudinal axis of the body to provide a reflective surface 32.9, and the diametrically opposed portion of the upper end of the body is formed as a flat, upright wall 33 parallel to the axis of the body. The reflecting prism formed by the surfaces 32.9, 33 permit the cone-shaped optical surface 32.2 at the bottom of the body to be viewed from a position to the side of the upper end of the body, as shown in FIG. 9 and 11.

The light-transmissive body of the dispenser of the invention should have sufficient optical clarity so that the optical surfaces at the bottom of the body can be easily seen through the aforesaid "windows", and should be chemically resistant to the liquid to be dispensed. When battery acid is the liquid to be dispensed, a plastic such as polystyrene, or a copolymer of styrene and acrylonitrile has proved acceptable. The optically clear body preferably is substantially colorless, although it is contemplated that in some instances it may be tinted slightly. The outer surfaces of the body, and particularly the reflective, optical surfaces at the bottom of the body and the surfaces ("windows") at the top of the body through which the reflecting optical surfaces are viewed, should be highly polished.

From an optical standpoint, the index of refraction of the light-transmissive body is such that when the body is in contact with air, light entering the body from any convenient source, such as the sun or an artificial light source, is reflected within the body; light reaching the optically reflecting surfaces at the bottom of the body are reflected upwardly so that they can be viewed through the "windows" at the top of the body. The optically reflective surfaces at the bottom of the body are so angled with respect to one another that light rays which travel downwardly through the body to the optical surfaces will be reflected when the optical surfaces are in contact with air. As is known, the angle of incidence of a light ray striking the optical surfaces at the bottom of the body must be greater than a known critical angle in order for the light rays to be reflected internally within the body so that they may be viewed at the top thereof. With the body configuration of the embodiment shown in FIG. 1, a light ray 40 which enters the body through the top 12.8 thereof, passes downwardly to the bottom of the body and is reflected back to the top by the coacting reflecting surfaces 12.4, 12.5, provided that the latter surfaces are both in contact with air. Light rays reflected from the optical surfaces at the bottom of the body will also strike the annular prism 12.9 at the upper edge of the body, and will be refracted outwardly as shown by arrow 41 to the eye of an observer. In the embodiment shown in FIGS. 9-13, available light which enters the light-transmissive body 32 will be reflected by the optical surfaces designated 32.2 at the bottom of the body and will be reflected toward the top for viewing from the top or from the side, as aforesaid.

Referring again to FIGS. 1-8, when the exposed optical surface 12.5 is exposed to a liquid, as when the bottom of the dispenser is immersed in a pool of liquid, light rays which strike the outer optical surface 12.5, which is in contact with the liquid, will be largely refracted into the liquid, and little if any reflection from the optical surfaces will be observed. It will be understood that the inner reflecting surface 12.4 of the embodiment of FIGS. 1-8 is permanently in contact with air because of the presence of the annular air space 18.7; the reflection of light, or the lack thereof, from the bottom of the dispenser is hence dependent upon whether the outer reflecting surface 12.5 is in contact with liquid. The angles of the reflecting surfaces 12.4, 12.5 of the embodiment of FIGS. 1-8, and 32.2 of the embodiment of FIGS. 9-13, have been selected so that reflection will occur from these surfaces when the surfaces are in contact with air, but refraction into the liquid will occur when the surfaces are in contact with liquid.

In use, as when a battery is to be filled with battery acid, the device of FIGS. 1-8 is inserted into the battery port defined by the raised walls 22.1, the projections 20.1 and spacers 20.2 providing an air passage for air to escape from the battery as it is filled. A plastic tube or hose 14.4, which is connected to the end of the tube 14, leads to a source of battery acid such as a carboy of sulfuric acid of the desired strength. The container of acid is elevated above the level of the dispenser so that acid will flow by gravity through the dispenser into the battery. The valve 16 is opened, as shown in FIG. 1, and a stream of acid 42.1 flows through the ducts 12.2, 12.1 and 18.3 into the battery to form a pool of acid designated generally as 42. The acid is thus dispensed through the plug 18.2 at a point below the outer optical surface 12.5 at the lower end of the body, and thus does not contact the latter surface. The level of the pool shown in FIG. 1 has risen above the battery plate 22.2 but has not yet reached the lower end of the dispenser. As a result, light rays which enter the body 12 are reflected from the inner and outer reflective optical surfaces 12.4, 12.5, and these surfaces may be viewed from above or from the side, as described above. FIG. 4 depicts the "picture" which is seen through the upper surface 12.8 of the body; the plug 18 (which may be of an opaque material) is in the center of the "picture"; also shown is the weld bead 18.6. The reflective optical surfaces 12.4, 12.5 appear as bright rings because of the light reflected upwardly therefrom. The duct 12.2, which leads to the plastic tube 14, can be dimly seen.

As the level of battery acid in the battery increases, the lower end of the body becomes immersed, as shown in FIG. 3. Internal light rays 43 striking the exposed optical surface 12.5 at the bottom of the body will be largely refracted into the battery acid, and little reflection from the optical surfaces 12.4, 12.5 will be observed at the top of the body. FIG. 5 shows the observed "picture" through the flat surface 12.8 at the top of the body; the optically reflecting surfaces 12.4, 12.5, which had been bright before immersion of the body, now appear dark, signaling to an observer that the level of liquid in the battery has risen to a point wherein the optical surface 12.5 has been immersed.

When the desired level of battery acid has been reached, the valve 16 is closed and the dispenser is removed. Because a certain small amount of battery acid will be retained in the ducts 12.1, 12.2, I desire to form the plug 18 with a relatively small diameter bore to reduce or eliminate dripping.

If the battery filling operation has now been completed, the dispenser is raised to a position above the battery acid supply and the valve is again opened so that battery acid may drain from the dispenser back into the acid carboy.

With reference to the dispenser shown in FIGS. 9-13, FIG. 12 shows the "picture" which is observed from the top of the body 32 before the bottom of the body has become immersed in liquid. The conical, optically reflective surface 32.2 appears as a bright, partial circle in the center of the "picture", and is partially bordered by a dark area representing the change in diameter of the body 32 to form the reduced diameter portion 32.5. FIG. 11 shows the "picture" observed by the viewer from the side of the body upper portion, as indicated in FIG. 9, this "picture" being substantially the same as that shown in FIG. 12 with the optical conical surface 32.2 appearing as a bright partial circle or ring.

As in the first-described embodiment, battery acid enters the dispenser from an elevated carboy through a flexible hose 31.2, and flows downwardly within the barrel 30 through the annular space between the barrel and the body portion 32.5 of reduced diameter. Downward pressure on the disc 32.6 compresses the spring 32.7, and causes the plug 34 to move downwardly away from the lower end of the barrel, the battery acid flowing down the outer surface of the downwardly depending lip 34.1 of the plug. As in the first-described embodiment, battery acid is thus prevented from contacting the conical optical surface 32.2 during the filling operation until the level of the liquid pool within the battery has risen to immerse the conical surface. When immersion occurs, internal light rays which previously had been reflected by the concial surface are largely refracted outwardly into the pool of liquid, and the conical surface 32.2, as viewed from above as in FIG. 13, appears dark, signifying that the battery has been filled to the desired level. When the filling operation has been completed, the dispenser 10' is raised above the carboy and the valve provided by the lower end 30.2 of the barrel and the plug 34 is opened to permit battery acid to drain back into the acid carboy.

While I have described a preferred embodiment of the present invention, it should be understood that various changes, adaptations, and modifications may be made therein without departing from the spirit of the invention and the scope of the appended claims.

What is claimed is:

1. A liquid dispenser with a liquid level indicator for introducing liquid into a container, such as battery acid into a battery, and for indicating the level of the liquid pool into which the liquid flows, comprising:
    a dispensing nozzle and having an elongated, light-transmissive body with an upper light-admitting end and a lower end alternately reflecting and dispersing the light as the lower end is respectively spaced above and immersed in the liquid pool, the upper end of the body having an upwardly facing end surface through which such reflected light may be seen, the presence or absence of reflected light at the outer end of the lighttransmissive portion indicating to an observer the height of the liquid pool, the light-transmissive body having a central bore opening through the lower end thereof and also opening through one side thereof, the nozzle also having an elongate rigid tube affixed to said one side of the light-transmissive body and having a liquid supply duct communicating with the open bore of the nozzle body, the elongate tube extending transversely of the nozzle body and having a length of the same order of magnitude as the length of the light-transmissive body to provide a handle for manually manipulating the nozzle body, the rigid tube having valve apparatus to open and close the supply duct to control flow of such battery acid to the nozzle body, and the valve apparatus having a valve-operating handle positioned adjacent the upper end surface of the nozzle body to facilitate ready coordinated valve operation in response to observations through said end surface.

2. The dispenser of claim 1 in which the reflector comprises co-acting conical inner and outer optical surfaces oriented with respect to each other at the inner end of the nozzle body so as to internally reflect light when each surface is in contact with air and, when at least one of the surfaces is in contact with liquid, to refract light into the liquid.

3. The dispenser of claim 1 wherein the outer end of the light-transmissive portion includes a reflecting prism oriented to enable light reflected internally from the reflector to be observed from the side of the dispenser.

4. The dispenser of claim 1 and the rigid tube having an inner end adjacent the light-transmissive body and an outer end, the valve apparatus having means normally urging the valve into a closed position to prevent the flow of liquid through the duct, the valve-operating handle being disposed adjacent the inner end of the rigid tube, and the outer end of the tube being unobstructed to be manually gripped and manipulated.

5. The dispenser of claim 1 wherein the elongate body has means defining a continuously open discharge orifice at the lower end and in liquid flow communication with the central bore, the discharge orifice being sufficiently small as to retain the liquid in the bore against the head of the liquid to the valve apparatus.

6. The dispenser of claim 1 wherein the light-transmissive body includes a slender inner end portion for insertion into the filler opening of a battery, and further includes a flange formed integrally of and in one piece with the body protruding transversely outwardly intermediate its length and positioned to limit the depth of insertion of said inner end portion into the battery opening.

7. The dispenser of claim 6 wherein said protruding shoulder includes projections oriented to contact the filler opening and to provide air spaces through which air may escape from the battery as the latter is filled.

8. The dispenser of claim 7 including spacer rings for adjusting the depth of insertion of the inner end into the battery filler opening, the rings being removably mounted on said inner end abutting the shoulder projections, the rings having ports therethrough constructed and arranged to overlap the ports of adjacent rings to provide a continuous air escape path from the battery.

9. A liquid dispenser with a liquid level indicator for introducing a liquid such as battery acid into a container and for indicating the level of the resulting liquid pool in the container, the dispenser comprising a nozzle having an upright, elongated, generally cylindrical body of light-transmissive material, the body having a light-admitting upper end and a lower end and having a peripheral wall defining a central, longitudinal, downwardly open bore, a combined rigid supply tube and handle affixed to the elongate body and having a liquid supply duct in flow communication with said central bore, the peripheral wall having concentric, conical inner and outer lower end surfaces converging abruptly at the lower end of the body and oriented at acute angles to the longitudinal axis of the body to cooperatively internally reflect light toward the upper end, and the upper end of the body having a central portion with a flat optical surface lying transversely of the longitudinal axis of the body to permit observation of the reflected light, a discharge orifice-defining insert affixed upon the lower end of the body in confronting and completely confining relation to the inner conical lower end surface and to seal the inner optical surface from liquid flowing from the bore.

10. The liquid dispenser according to claim 9 wherein the inner lower end conical surface of the peripheral wall has upper and lower edge portions, the insert being sealed to the peripheral wall adjacent said upper and lower edge portions and around the entire periphery thereof, and said insert being spaced from said inner conical surface between the upper and lower edge portions thereof and defining an entirely enclosed, liquid free open space adjoining the entire periphery of said inner conical surface.

11. The liquid dispenser according to claim 9 and said conical inner and outer lower end surfaces having peripheral lower edge portions adjoining each other, the insert extending endwise downwardly of the nozzle body from said adjoining lower edge portions and at an oblique angle relative to the outer conical end surface of the wall to physically shield the surface from damage.

12. The liquid dispenser according to claim 9 and said conical inner and outer lower end surfaces being arranged symmetrically of each other and oriented at approximately 45° angles relative to the longitudinal axis of the body and at approximately 90° angles to each other.

13. A liquid dispenser with a liquid level indicator for introducing liquid into a container, such as battery acid into a battery, and for indicating the level of the liquid pool into which the liquid flows, comprising:

a dispensing nozzle having an elongate light-transmissive and integrally molded body with a light-admitting upper end and a slender lower end for insertion into an entrance port of such a container, the upper end of the body having an upwardly facing end surface through which reflected light may be seen, the light-transmissive body having a central bore extending and opening through the lower end thereof and also extending and opening through one side thereof, said light-transmissive body defining a peripheral wall around said central bore and defining downwardly facing concentric conical inner and outer lower end surfaces arranged symmetrically of each other and oriented at approximately 45° angles to the longitudinal axis of the body and at approximately 90° angles to each other to cooperatively internally reflect light toward the upper end when such surfaces are spaced above the liquid pool, the dispensing nozzle also including an elongate rigid tube affixed to said one side of the light-transmissive body and having a liquid supply duct communicating with the open bore of the nozzle body, the elongate tube extending transversely of the nozzle body at an oblique angle and said rigid tube extending at an obtuse angle with respect to the slender lower end of the elongate body, said rigid tube having a length in excess of the length of said light-transmissive body and forming a handle for manipulating said body, a valve apparatus on said elongate rigid tube adjacent the light-transmissive body and opening and closing the supply duct to control flow of liquid such as battery acid to the nozzle body, the valve apparatus including a valve-operating handle positioned adjacent the upwardly facing end surface of the nozzle body to facilitate readily coordinated valve operation in response to observations through said end surface, means for connecting the supply duct of the rigid tube with an external source of such liquid, and a discharge orifice-defining insert affixed upon the lower end of the nozzle body and projecting into the central bore thereof, the discharge orifice being sufficiently small as to retain the liquid in the bore against the head of liquid therein to the valve apparatus to prevent dripping of liquid from the nozzle when the valve is closed, the insert confronting the inner conical lower end surface of the nozzle body and being sealed around the entire periphery thereof to the upper and lower edge port-ons of said inner conical surface to prevent liquid flowing through the bore and orifice from engaging said inner conical surface, the insert being shaped to define an open peripheral space opposite said inner conical surface, and said insert having a downwardly extending portion with a substantially cylindrical exterior wall extending endwise downwardly from the nozzle body adjacent the adjoining lower edge portions of said conical inner and outer end surfaces to shield the conical outer end surface from significant physical damage.

14. The liquid dispenser according to claim 13 and the upper end of said light-transmissive body having a peripheral prism with an oblique surface to internally reflect reflected light outwardly in a transverse direction from the light-transmissive nozzle body.

* * * * *